US009280755B2

(12) United States Patent
Tsai et al.

(10) Patent No.: US 9,280,755 B2
(45) Date of Patent: Mar. 8, 2016

(54) SYSTEM FOR MANAGING PRODUCT INVENTORY COUNTS

(75) Inventors: Sin-Mei Tsai, Cupertino, CA (US); Diana Lynn Williams, Burlingame, CA (US); Gavin James Gordon Butler, San Carlos, CA (US)

(73) Assignee: Joyus, Inc., San Francisko, CA (US)

( * ) Notice: Subject to any disclaimer, the term of this patent is extended or adjusted under 35 U.S.C. 154(b) by 598 days.

(21) Appl. No.: 13/437,416

(22) Filed: Apr. 2, 2012

(65) Prior Publication Data

US 2012/0296782 A1    Nov. 22, 2012

Related U.S. Application Data

(63) Continuation-in-part of application No. 13/112,751, filed on May 20, 2011.

(51) Int. Cl.
*G06Q 30/00* (2012.01)
*G06Q 10/08* (2012.01)
*G06Q 30/02* (2012.01)

(52) U.S. Cl.
CPC ............... *G06Q 10/08* (2013.01); *G06Q 30/02* (2013.01)

(58) Field of Classification Search
CPC ... G06Q 30/02; G06Q 30/0207; G06Q 30/00; G06Q 30/0224; G06Q 30/0635; G06Q 30/0241; G06Q 30/0601; G06Q 30/0643; G06Q 30/0623; G06Q 30/06; G06Q 30/0214
USPC ................ 705/14.6, 14.4, 26.1, 14.55, 14.58, 705/14.16
See application file for complete search history.

(56) References Cited

U.S. PATENT DOCUMENTS 8,312,486 B1    11/2012  Briggs et al.
8,533,753 B2     9/2013  Briggs et al.
(Continued)

FOREIGN PATENT DOCUMENTS

CA    2847262 A1    12/2013
EP    2467813 A1    12/2011
(Continued)

OTHER PUBLICATIONS

U.S. Appl. No. 14/338,164, filed Jul. 22, 2014, Office Action, Sep. 3, 2014
(Continued)

*Primary Examiner* — Thomas M Hammond, III
*Assistant Examiner* — Kyle Mosley
(74) *Attorney, Agent, or Firm* — Hickman Palermo Becker Bingham LLP

(57) ABSTRACT

A system for managing product inventory includes an Internet-connected server and software executing on the server from a non-transitory physical medium, the software providing establishment of a first association of at least one stock keeping unit (SKU) and any associated metadata including product availability counts to at least one point in time and or at least one time range identified within an interactive shopping media presentation, establishment of a second association of at least one potential consumer to the interactive shopping media presentation, monitoring for and tracking of interaction sequences initiated by the at least one potential consumer, the interaction sequences enabled from within the interactive shopping media presentation or from within an interactive display associated thereto, and adjustment of the SKU-based product availability counts in the SKU metadata relative to the latest interaction results.

22 Claims, 4 Drawing Sheets

(56) References Cited

U.S. PATENT DOCUMENTS

| | | |
|---|---|---|
| 8,549,555 B2 | 10/2013 | Briggs et al. |
| 8,769,053 B2 | 7/2014 | Spitz et al. |
| 8,782,690 B2 | 7/2014 | Briggs et al. |
| 8,813,132 B2 | 8/2014 | Andrews, II et al. |
| 2002/0072974 A1* | 6/2002 | Pugliese et al. ............... 705/14 |
| 2003/0115602 A1 | 6/2003 | Knee et al. |
| 2007/0276721 A1 | 11/2007 | Jackson |
| 2008/0104634 A1 | 5/2008 | Gajdos et al. |
| 2010/0306058 A1* | 12/2010 | Johnson et al. ............ 705/14.55 |
| 2011/0191809 A1 | 8/2011 | Briggs et al. |
| 2011/0225036 A1 | 9/2011 | Reddy et al. |
| 2013/0144903 A1 | 6/2013 | Andrews, II et al. |
| 2014/0032366 A1 | 1/2014 | Spitz et al. |
| 2014/0089966 A1 | 3/2014 | Briggs et al. |
| 2014/0095330 A1 | 4/2014 | Briggs et al. |
| 2014/0250211 A1 | 9/2014 | Spitz et al. |
| 2014/0282700 A1 | 9/2014 | Briggs et al. |

FOREIGN PATENT DOCUMENTS

| | | |
|---|---|---|
| EP | 2758885 A1 | 7/2013 |
| WO | WO2011/149491 A1 | 12/2011 |
| WO | WO2013/033239 A1 | 3/2013 |
| WO | WO2013/192557 A2 | 12/2013 |

OTHER PUBLICATIONS

U.S. Appl. No. 13/772,788, filed Feb. 21, 2013, Office Action, Sep. 5, 2014.

U.S. Appl. No. 13/112,751, filed May 20, 2011, Office Action, Sep. 4, 2014.

U.S. Appl. No. 14/338,164, filed Jul. 22, 2014, Final Office Action, Jan. 5, 2015.

U.S. Appl. No. 13/772,788, filed Feb. 21, 2013, Final Office Action, Jan. 21, 2015.

U.S. Appl. No. 13/112,751, filed May 20, 2011, Final Office Action, Jan. 8, 2015.

U.S. Appl. No. 13/112,751, filed May 20, 2011, Interview Summary, Mar. 6, 2015.

* cited by examiner

SYSTEM FOR MANAGING PRODUCT INVENTORY COUNTS

CROSS-REFERENCE TO RELATED DOCUMENTS

The system is a continuation in part to U.S. patent application Ser. No. 13/112,751, filed May 20, 2011, entitled "System for Selling Products Based on Product Collections Represented in Video", the entire disclosure of which is incorporated herein in its entirety at least by reference.

BACKGROUND OF THE INVENTION

1. Field of the Invention

The present invention is in the field of ecommerce including shopping through interactive media and pertains particularly to methods and apparatus for managing available inventory counts relative to consumer activity.

2. Discussion of the State of the Art

In the field of ecommerce, consumers may connect to the Internet and shop for products and services over the network by interacting with web-based services including web pages, order forms, and payment submission interfaces. Most online retailers identify their available products using a stock keeping unit (SKU) system to uniquely identify products and product variants for accounting purposes and inventory control.

More recently, shopping interfaces have become more flexible and interactive including enabling potential consumers to shop for products through interactive media including interactive video presentations. In typical systems, inventory management is handled separately from transaction processing. That is to say that inventory control and management processes are initiated only when sufficient data is available from transaction system accounting to trigger reordering or restocking of product to facilitate future demand.

Often consumers spend significant time and effort navigating an ecommerce site and initiating a transaction process only to discover that the desired product or product version is not currently available in stock resulting in a delay in normal service. Moreover, processing numerous transactions for out-of-stock products further complicates inventory management.

Therefore, what is clearly needed is a system for managing transaction activity and product inventory that more closely integrates the two processes and solves the problems mentioned above.

SUMMARY OF THE INVENTION

The problem stated above is that better integration is desirable for an ecommerce business charged with managing transactions and controlling product inventory, but many of the conventional means for managing transactions and product inventory, such as supply line management systems and transaction processing services, are not well integrated in terms of process integration and in view of the potential consumer activity including perceived future demand for certain products or product versions. The inventors therefore considered functional components of an ecommerce system, looking for elements that exhibit interoperability that could potentially be harnessed to provide an efficient ecommerce platform in a manner that would not create or foster disconnects between consumer activity and product inventory.

Every ecommerce site is propelled by consumer patronage, one by-product of which is an abundance of processed orders that must be fulfilled in a consumer friendly manner. Most such ecommerce sites employ a variety of servers, databases, and software applications to conduct the required transaction processing and order fulfillment, and servers, databases, and software applications are typically a part of such apparatus.

The present inventor realized in an inventive moment that if, within a single interactive shopping interface, product availability could be associated in real time with consumer activity and a single accounting process could be implemented that accounts for both purchase activity and available inventory, significant improvement in overall inventory management efficiency and consumer loyalty might result. The inventor therefore constructed a unique system for managing product inventory that allowed direct purchasing activity to directly effect product availability counts in real time and in a manner visible to potential consumers interacting with the shopping interface. A significant integration between transaction activity and inventory count updating results, with no impediment to the transaction process created.

Accordingly, in an embodiment of the present invention, a system for managing product inventory is provided and includes an Internet-connected server and software executing on the server from a non-transitory physical medium, the software providing establishment of a first association of at least one stock keeping unit (SKU) and any associated metadata including product availability counts to at least one point in time and or at least one time range identified within an interactive shopping media presentation, establishment of a second association of at least one potential consumer to the interactive shopping media presentation, monitoring for and tracking of interaction sequences initiated by the at least one potential consumer, the interaction sequences enabled from within the interactive shopping media presentation or from within an interactive display associated thereto, and adjustment of the SKU-based product availability counts in the SKU metadata relative to the latest interaction results.

In one embodiment, the associated metadata includes one or a combination of color, size, quantity, price, and credits available, if any, along with the current product inventory count or counts. In a preferred embodiment, the point in time or time range coincides with a graphic and or audio representation of the at least one SKU bearing product. In one embodiment, the interactive shopping media presentation is an audio video or video file. In one embodiment, the interactive shopping media presentation is a programmed sequence of interactive graphic slides.

In one embodiment, the establishment of the first association includes at least one interactive visual indicator in the interactive shopping media presentation that is visible at the at least one point in time and or within the at least one time range specified. In one embodiment, the establishment of the second association is dynamic and automatic. In preferred embodiments, the interaction sequences include purchase transactions. In the embodiment including at least one interactive visual indicator in the interactive shopping media presentation, the interactive visual indicator is one of a visual overlay, a text box, a link to an order form, or a purchasing icon.

In one embodiment, the software further provides a posting interface, the posting interface adapted to enable posting of comments and recommendations by potential consumers associated with the interactive shopping media presentation. In a variation of this embodiment, the posting interface creates a third dynamic association of at least one tip, recommendation, or comment to at least one point in time and or at least one time range within the video. In the embodiment including at least one interactive visual indicator in the interactive shopping media presentation, the interactive visual indicator can be manipulated by the at least one potential consumer to initiate an interaction sequence resulting in a purchase.

In the embodiment wherein the interaction sequences include purchase transactions, the interaction sequences initiated within the interactive shopping media presentation by the at least one potential consumer continue on a transaction server. In a preferred embodiment, the product availability counts are adjusted dynamically during accounting based on number of confirmed purchases. In this embodiment, product inventory is dynamically reordered or replenished to updated counts based on count thresholds triggered through count adjustments relative to consumer interaction results.

According to one aspect of the present invention a method is provided for managing product inventory. The method includes the steps (a) mapping product SKUs, associated metadata, and current product availability counts associated therewith to at least one point in time and or at least one time range identified within an interactive shopping media presentation, (b) mapping at least one potential consumer to the interactive shopping media presentation, (c) monitoring and tracking interaction sequences initiated by the at least one potential consumer, the interaction sequences enabled from within the interactive shopping media presentation or from within an interactive display associated thereto, and (d) adjusting the SKU-based product availability counts in the SKU metadata relative to the latest interaction results monitored and tracked in step (c).

According to one aspect of the method, in step (a), the associated metadata includes one or a combination of color, size, quantity, price, and credits available, if any, along with the current product inventory count or counts. In one aspect, in step (a), the point in time or time range coincides with a graphic and or audio representation of the at least one SKU bearing product. In one aspect, in step (a), association includes at least one interactive visual indicator in the interactive shopping media presentation that is visible at the at least one point in time and or within the at least one time range specified. In this aspect, the interactive visual indicator is one of a visual overlay, a text box, a link to an order form, or a purchasing icon.

BRIEF DESCRIPTION OF THE DRAWING FIGURES

DETAILED DESCRIPTION

The present inventors provide a system for managing product inventory that provides automated updating of product inventory counts through analysis of in-video initiated interactions, the updated counts associated with appropriate interactive videos and the products represented therein. The present invention will be described in enabling detail using the following examples, which may describe more than one relevant embodiment falling within the scope of the present invention.

Figure 1:
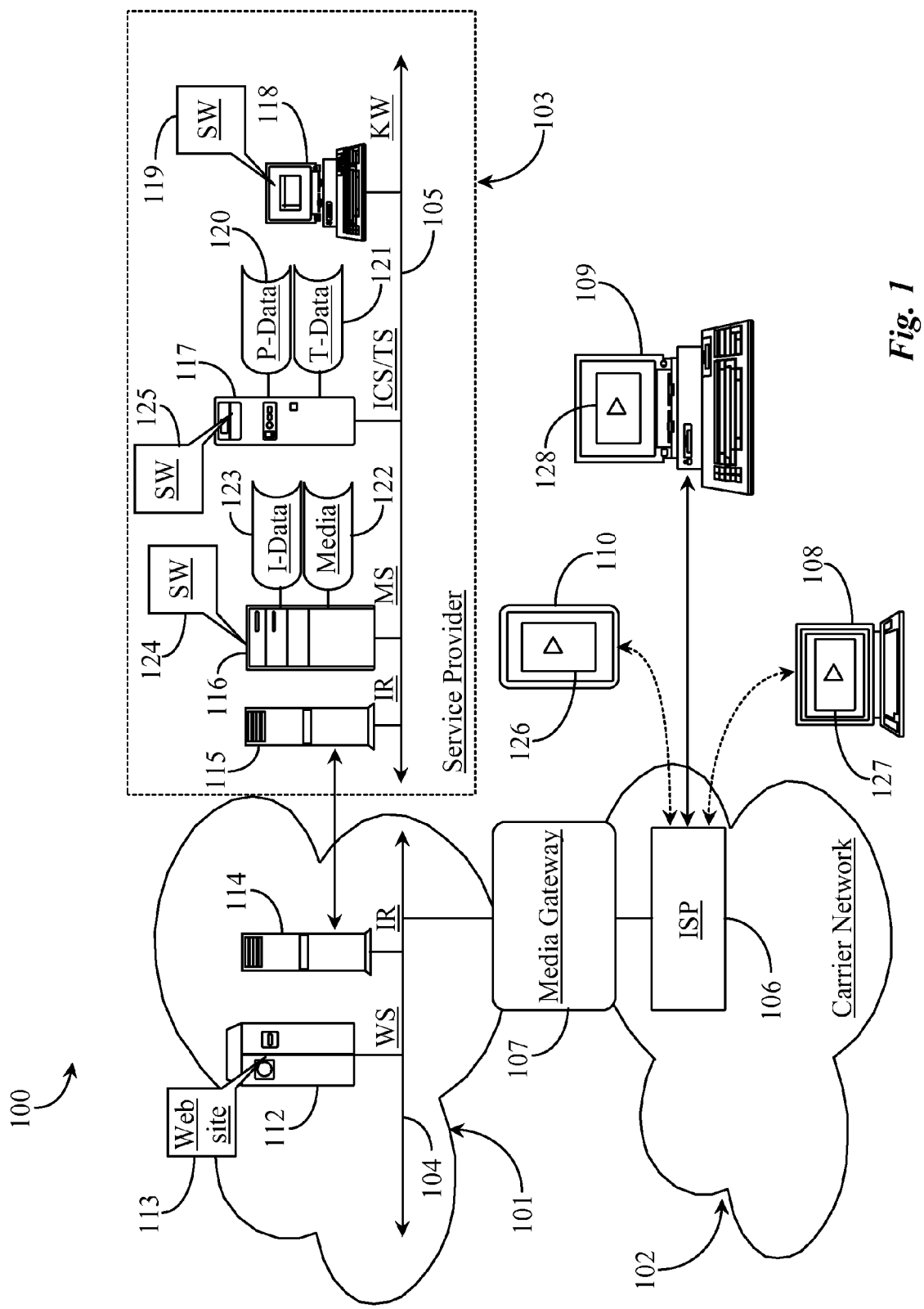
FIG. 1 is an architectural overview of an ecommerce network supporting in-video shopping and inventory control according to an embodiment of the present invention.

FIG. 1 is an architectural overview of an ecommerce network 100 supporting in-video shopping and inventory control according to an embodiment of the present invention. Ecommerce network 100 includes an Internet network 101, a communications carrier network 102, and a service provider network 105 operated by a service provider entity 103.

Internet 101 is further exemplified by an Internet backbone 104. Internet backbone 104 represents all of the lines, equipment, and access points making up the Internet network as a whole, including connected sub-networks. Therefore, there are no geographic limits to the practice of the present invention. The inventor chooses the Internet network as the primary ecommerce carrier network because of its high public access characteristic. However, other wide-area networks (WANs) such as a corporate WAN, a university or campus WAN, or a municipal area network (MAN) could serve as the primary ecommerce network without departing from the spirit and scope of the present invention.

Carrier network 102 represents any digital telecommunications carrier network that may support and facilitate access to Internet 101 to wireless and or wired network-capable appliances such as a laptop computer 108, a smart phone 110, a desktop computer 109, and TV appliances that have Internet access. Carrier network 102 includes an Internet service provider (ISP) entity 106. ISP 106 provides Internet access to Internet 101 through a media gateway 107 and an Internet access line (connected to backbone 104). Laptop 108 and smart phone 110 are illustrated in a state of wireless mobile connection to Internet backbone 104 through ISP 106 and media gateway 107. Desktop computer 109 is illustrated in a state of wired connection to Internet backbone 104 via the same path. Carrier network 102 may include the public switched telephone network (PSTN) and other carrier networks both wired and wireless.

Service provider 103 represents the facility of an organization, corporation, or company sells products and services that are accessible through Internet network 101 through consumer interaction with interactive shopping media. Service provider facility 103 includes a local area network (LAN) 105. LAN 105 may instead be a corporate WAN without departing from the spirit and scope of the present invention. LAN 105 has connection to Internet backbone 104 through an Internet router (IR) 115 that has connectivity to an Internet router (IR) 114, in turn, connected to Internet backbone 104.

Internet backbone 104 supports a web server (WS) 112. WS 112 includes a non-transitory physical medium that contains all of the software and data required to enable function as a web server capable of serving ecommerce web pages to potential consumers operating Internet capable appliances such as laptop 108, smart phone 110, or desktop computer 109. Web server 112 hosts an ecommerce website 113. Website 113 is a consumer access point for services provided by service provider entity 103. Web server 112 may be operated by a third-party web hosting service or by service provider entity 103 without departing from the spirit and scope of the present invention.

Potential consumers operating Internet-capable appliances like laptop 108, smart phone 110, and desktop computer 109 may navigate to website 113 hosted on web server 112 to engage in interactive, in-media shopping to purchase products offered by service providing entity 103. In-media shopping is facilitated by provision of interactive media such as through interactive videos that display, describe, and promote purchase of products and services. In a preferred embodiment, potential consumers may initiate interactions from within the interactive presentations to purchase, recommend, or comment on products and services offered through the presentations. An interactive media presentation is typically a video but may also be any other type of interactive presentation such as an interactive slide show, power point presentation, or some other programmed media presentation that visually presents one or more products and or services for purchase.

LAN 105 within service provider facility 103 supports a media server (MS) 116. Media server 116 includes a non-transitory physical medium that contains all of the software and data required to enable function as a media server. Media server 116 has connection to a media repository 122 that contains media presentations that are served to potential consumers connected to website 113 running on web server 112. In this embodiment, the media presentations are videos that users may access through web site 113. Media server 116 hosts software 124. Software 124 is adapted to monitor consumer interaction with served and active videos providing an association between consumers and served videos and record of interaction within the served videos. MS 116 has connection to an interaction repository 123 that records all interaction between consumers and interactive video components embedded within and associated to each served video.

Interactions include transactions for purchasing offered products and services. Interactions may also include initiation and association of text comments to specific points in time or time ranges within served videos, the comments about products, product hosts, product sellers, or recommendations and tips. In this example, interactions may be initiated through video interfaces and may be initiated by potential consumers, consumers whom have purchased products and or services, and or by product sellers, merchant representatives or in-video hosts that are depicted within the video presentation describing or presenting offered products. Each connected Internet-capable appliance depicted in this example has an ecommerce media presentation or video displayed for interaction or in a state of play.

LAN 105 within facility 103 supports an inventory control/transaction server (ICS/TS) 117. Server 117 includes a non-transitory physical medium that contains all of the software and data required to enable transaction service and inventory control or management services. Server 117 has connection to a product repository 120 that contains all of the product data for all of the products offered through website 113. Product data includes a unique product identifier for each product type and variation or version. Each product and variation thereof offered through website 113 is uniquely identified by a stock-keeping unit (SKU).

SKUs include metadata that describes product attributes like product type, size, color, version, and any other descriptive attributes that may separate the product from other products offered. In a preferred embodiment, SKU metadata further includes information about current product availability such as by product inventory count. Other SKU metadata may include but are not limited to basic inventory management fields like title, price, reward for purchase (credits), color, size, and so on. SKU metadata may also include video identifiers of the videos that represent the products, cue points, time stamps, or time windows or ranges relative to where in the video the product is represented. SKUs may further include metadata identifying product hosts, sellers, merchants, brands, etc. SKU metadata is provided within each video for each product presented within that video. An example of a video/SKU mapping table may look like the table below.

| Video ID | Product/SKU ID | Cue Point/Time Stamp |
|----------|----------------|----------------------|
| ABC123   | 123123         | 0:25                 |
| ABC124   | 123124         | 1:23                 |
| ABC125   | 123125         | 2:22                 |

A first column lists unique media identifiers, in this case, video identification numbers. A next column lists product or SKU identification numbers of one or more products that appear in the video. A third column lists the cue points or time stamps marking where the product identification is anchored in the video. One video may include more than one product/SKU that is represented in the video.

Server 117 has connection to a transaction repository 121. Repository 121 contains all of the consumer transaction data at least relative to purchase transactions and the outcomes of those transactions. In this example, a consumer operating an Internet-capable appliance like laptop 108 may access a product video such as video 127 and play the video to engage in in-media shopping. The consumer may, at specific points in the video or via interactive components associated with or embedded within the video data, initiate a purchasing transaction sequence that calls ICS/TS server 117 to host the remainder of the transaction sequence including hosting product order form filling, payment information and payment submission, order confirmation, and establishment of shipping details.

Server 117 hosts software (SW) 125. Software 125 is adapted to analyze the results of transactions initiated by consumers through in-media shopping relative to order and or shipping counts of available products, and provides update services relative to current inventory product counts affected by the transactions monitored at the server. For example, if a product SKU has a current inventory count of 150, and a transaction occurs where five units of the specified product are ordered, SW 125 may update the current SKU metadata for that product by lowering the inventory count by five units. This update is automatic to the product repository under the targeted SKU and automatic to the SKU metadata associated with the videos through which that product is available.

LAN 105 within service provider facility 103 supports a LAN-connected workstation 118. Workstation 118 includes a non-transitory physical medium that contains all of the software and data required to enable function as a LAN-connected workstation. A knowledge worker (KW) operates workstation 118 and has the authority to establish manual or semi-automated associations between SKUs and accompanying metadata to the individual media presentations through which those products are presented to potential consumers, in this case, interactive videos.

A KW operating workstation 118 may, with the aid of SW 119, create associations between product SKUs and videos including determination and implementation of the specific interactive component types that will be available to the potential consumer playing the video for the purpose of initiating an interaction from within the video. Such interactive component types include but are not limited to video overlays, interactive pop-up screens, interactive purchase icons or radio buttons, interactive order forms, and so on. SW 119 enables the KW operating workstation 118 to determine points in time in a video where the interactive component becomes available or visible to the potential consumer where such component provides interactive capability to the potential consumer to initiate an interaction sequence. Execution of such interactive components may be associated with specific points in time or specific time ranges within the video presentation and may pop-up or otherwise become visible to a potential consumer at the specified time point or during the specified time range during video runtime.

SW 119 enables the KW operating station 118 to establish a first association between SKUs and associated metadata, including product counts to at least one point in time or time range within a video. These associations may coincide with the interactive components that enable the potential consumer to initiate an interaction associated with a particular SKU. In this way, if a product presented in a video is not available immediately for purchase, the interactive component that would initiate a transaction to purchase the product may be disabled automatically within the video. In another embodiment, the product counts are visible to or communicated to the potential consumer and when a product becomes unavailable, an indication of product unavailability is communicated to the potential consumer as a pop-up or other visual indication. An option may be provided for ordering the out-of-stock product with understanding that the product shipment might be delayed and the estimated time of delay before the product might arrive to the consumer.

All of the videos in media repository 122 that are subject to service are updated with new product availability counts as transactions are processed reducing the product counts in inventory. This process is automatic and may be transparent to the potential consumers. In one embodiment, product counts in inventory are associated to a threshold trigger count that when breached causes a re-stocking or re-ordering of the affected product. In one embodiment where potential consumers still order out-of-stock products, transaction data resulting from such orders may be used to mitigate restock counts. For example, if there are 50 units of SKU#1234, and transaction data results indicate that 40 units were ordered, the SKU data may be updated to show that there are only 10 units available (not currently on order) at the time of the next purchase attempt. If a re-stocking threshold count of 20 units is established for that SKU, then a re-ordering process or inventory replenishment process may be automatically initiated based on the count.

As transaction results become available to the system, the SKU counts may continually be updated whether the SKU is restocked or not. In one embodiment, a product availability count associated with an SKU in a video may reflect a negative number indicating that more product is on order than is immediately available in stock. As new product is stocked, all SKU inventory counts in the metadata associated with all of the videos in which the product is demonstrated are updated to reflect the new counts. Various interactive components associated with enabling transaction initiation relative to a product may be enabled to read current SKU product availability counts. In some cases where the ordering process depends on the availability of stocked products, and counts are zero, or otherwise below a preset threshold count, those interactive components may not execute and display until the current product count is updated again and reflects available product in stock for online ordering.

In alternative embodiments interactive components may be suppressed by a low inventory count, velocity of inventory change, or demand for a product, and related data and statistics may be displayed to urge a customer to buy an item. Examples of such representations are: "Only 3 left!", "3 Seasons Tree Wall Decal sold in last 15 minutes", and "3 other customers have placed Seasons Tree Wall Decal in their shopping carts".

In one embodiment, SW 124, SW 125, and SW 119, are part of a software suite that may reside and execute from the non-transitory physical medium of a single server adapted to serve media, track interactions, process transactions, and mange product inventory. In this example, the media server is dedicated, but the transaction server and inventory control server are combined on one machine. It is noted herein that SW 119 may be resident on server 117 or on server 116 without departing from the spirit and scope of the present invention. A KW operating computer 118 may access SW 119 from either server.

Figure 2:
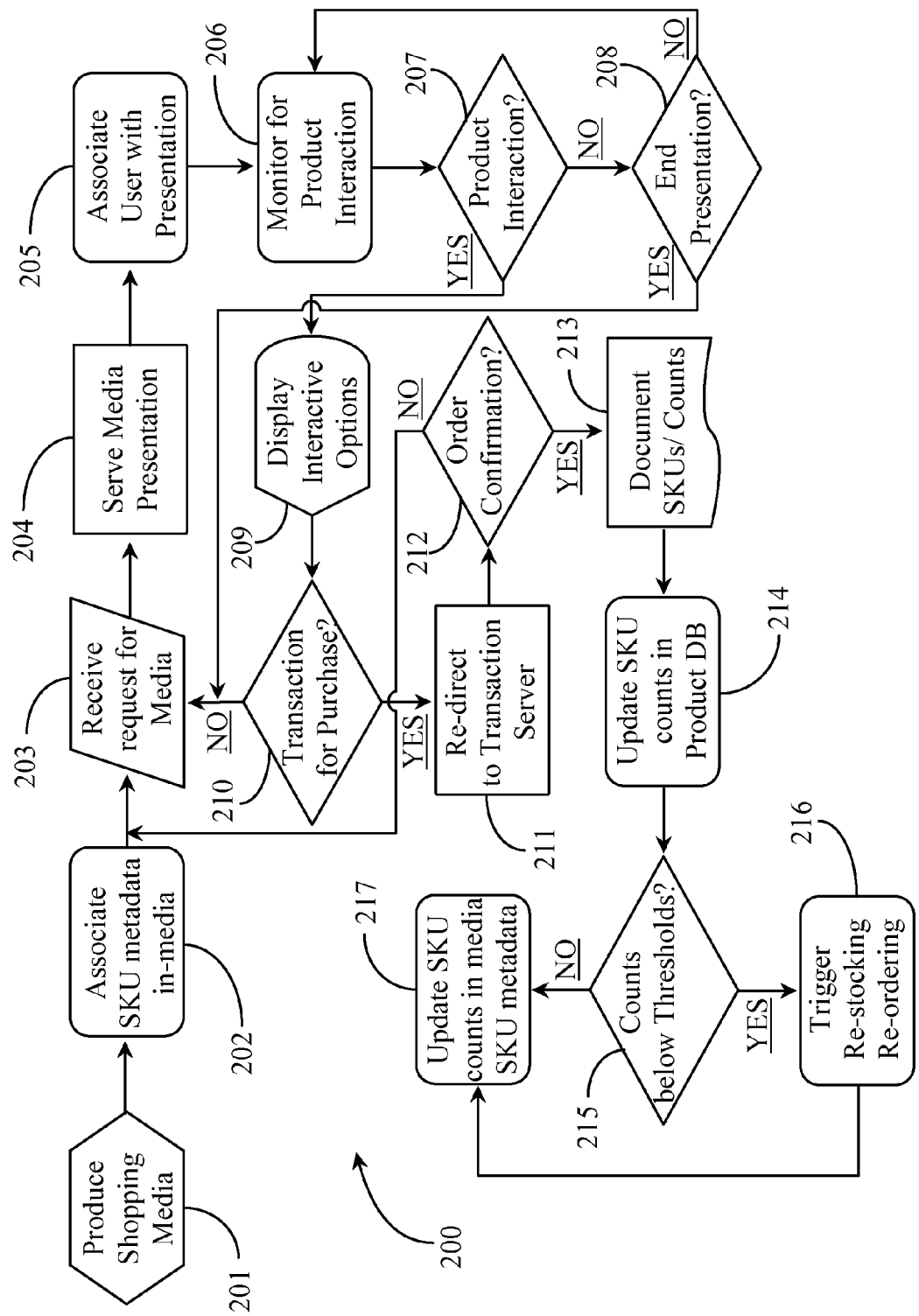
FIG. 2 is a process flow chart depicting steps for controlling product inventory counts based on transaction activity according to the embodiment of FIG. 1.

FIG. 2 is a process flow chart 200 depicting steps for controlling product inventory counts based on transaction activity according to the embodiment of FIG. 1. It is assumed that before media service can occur, the shopping media is produced and the correct product SKUs and metadata associated to one or more points in time or to one or more time ranges in media as depicted in steps 201 and 202. In one aspect of the process, the media is an interactive shopping video. In other aspects, the media might be a power point presentation, a programmed slide show, or some other animated digital media presentation.

At step 203, the media server analogous to server 116 of FIG. 1 receives a request for media from the website. At step 204, the media server serves the requested presentation. The media presentation is an interactive shopping video in one embodiment. In this example, the potential consumer that initiated the request for media may play the video while actively connected to the website through which the media request was initiated. For example, the website may include product video pages where potential consumers can shop through video interaction.

The media service associates the potential consumer with the served presentation at step 205. This step may be performed at the time of media service or before the time of media service, but after the request was received and the appropriate media file identified for service. The media server monitors the interaction between the potential consumer and the served media while the media is playing at step 206. The media server monitors chiefly for interaction between the consumer and the interactive component in the video that launches a transaction sequence relative to a specific SKU. This should not be construed a limitation to the practice of the invention as the media server may monitor the use of video player controls and commands including stop, pause, play, rewind, skip, and forward. The media server also records the session timeline as the video plays and always knows the position of the consumer with respect to the coordinated video and interactive data components, which are also served by the media server.

The system determines if there has been interaction with interactive components relative to a specific SKU in the served video at step 207. Knowledge of product interaction might be that the monitoring software detects the consumer selecting a buy now button that pops up at a specific point in time in the video served. The interactive component may enable purchase of the product and may be executed at a specific point in time in the video corresponding generally, but not restrictively with the end of the product presentation. The product is described and quantified by SKU and associated metadata. The SKU and metadata may be read by the media server and by interactive components associated with the video to the specific SKUs anchored, or otherwise associated to points in time in the video or to a time range in the video.

If the system determines at step 207, that there is no product interaction, it may determine at step 208, if the presentation is ended. If the presentation has not ended at step 208, then the process may resolve back to step 206 for continued monitoring. If the system determines that the presentation has ended at step 208, while no product interaction was detected at step 207, the process moves back to step 203 where processing subsequent media requests continues.

If the system detects that there is product interaction at step 207, then the system may display interactive options to the consumer. Interactive options may vary and may include options that do not involve purchasing the product. However, for inventory management purposes, this process is focused on product interaction with intent by the consumer, to purchase the product. The system determines if a purchase transaction has been initiated at step 210. The potential consumer who interacts with an interactive option in step 209 such as a buy now button, for example, may initiate a transaction sequence from within the video. If a transaction for purchase was not determined at step 210, then the process may end for that session as the process is focused on accounting for inventory control purposes. The process resolves back to step 203 for continued media service. Other types of interaction sequences that are possible through interactive shopping media may not relate directly to inventory control and are therefore not illustrated in this example.

If a transaction sequence is detected by the system at step 210, the interaction may be redirected in step 211 to a transaction server analogous to server 117 of FIG. 1. This step is optional as transaction servicing may occur over the same connection by a single server without departing from the spirit and scope of the present invention. The media server may continue monitoring the interaction sequence at the transaction server to determine if the order is confirmed such as by successful submission of payment information. In one aspect, the media server may pass off the responsibility for continued monitoring to the transaction server. The exact distribution of software depends in part on the architecture used in the system. If at step 212, no order is confirmed, the process may end for that session and may resolve back to step 203 where subsequent requests for media initiated by other potential consumers are continually processed.

If an order is confirmed at step 212, the system documents the SKUs and accompanying product counts in the confirmed order at step 213. The system updates SKU product counts in the product database at step 214. In this step the system is relying on confirmed order data rather than actual shipping data. Corrections in product counts can be adjusted, for example, if an order is cancelled anytime after order confirmation. The system may make a determination at step 215, if product counts are below pre-established thresholds that might trigger reorder of product or restocking of product from another inventory location. Establishing restocking triggers relative to SKUs is not a requirement of the present invention.

If step 215 is eliminated from process 200, the process moves from step 214 directly to step 217 where SKU counts in the SKU metadata associated with each media presentation demonstrating those products are updated to reflect the most recent product counts in inventory. If process 200 includes step 215 and the system determines that reorder or restocking thresholds have been triggered, then the process moves to step 216 where restocking or reordering of product is undertaken. The restocking or reordering may be automatic and based solely upon actual product counts from confirmed orders. In some aspects, product ordering may be allowed against negative inventory counts at one location if restocking involves a simple movement of product from one inventory location to another inventory location, or if the product can be drop shipped from some another inventory location under the sellers control.

At step 217, the SKU product counts in all of the relevant media presentations are updated with respect to the metadata associated with the SKU in the media presentation data that is stored with the media data and that is served upon request to the potential consumer system. As described previously, components that provide interaction capability to a potential consumer through the media may be controlled to execute or not to execute based on the product count metadata associated with the SKU(s) affected by the interactive component.

It is noted herein that interactions may be initiated through the interactive components that are part of the media data served along with the media. Such interaction sequences proceed through redirection or by incorporation of additional web-based services into the interactive process such as utilizing a transaction and inventory control service established on the non-transitory medium of a single machine connected to the network. Transition from interaction through the media to the ordering process hosted on the transaction server is transparent to the consumer. Other interactive tools such as shopping cart icons, etc. may be visible in the media presentation or on a tool bar associated with the presentation interface such as a video player.

Figure 3:
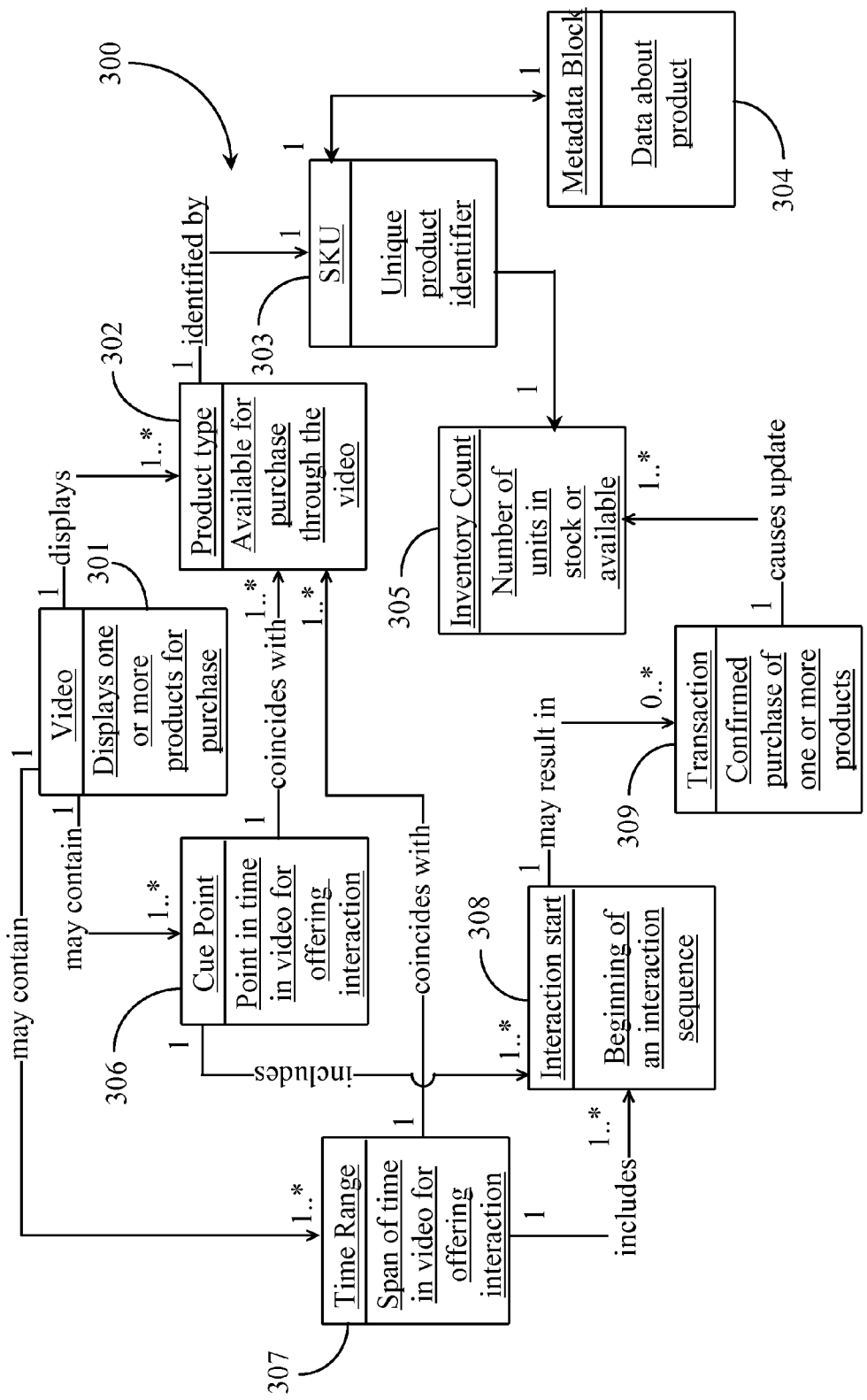
FIG. 3 is a simple unified modeling language diagram depicting an interactive video model enhanced for updating inventory counts according to an embodiment of the present invention.

FIG. 3 is a simple unified modeling language diagram 300 depicting an interactive video model enhanced for updating inventory counts according to an embodiment of the present invention. In this example, the media presentation is an interactive video 301. Video 301 displays one or more available products and or services for purchase. This model focuses on tangible products that have SKU identification. One video 301 displays one to many product types 302 that are available for purchase. One SKU number 303 uniquely identifies one product type or version 302. The level of granularity for product separation may vary over different product types and the SKU may include associated metadata that identifies differences between products like size, color, material, etc.

Each SKU number 303 assigned to a product 302 includes a metadata block containing data about the product. Initial data about a product may be included in the actual SKU number such as SL (straight leg), SM (small), LG (large), or any other physical attribute that may be expressed as an acronym and added to the SKU integers to further isolate the product from other product versions. For example, a skirt from a same designer and brand may be available in several different sizes and colors. In that case a unique SKU may be provided incorporating the color and size differences into the actual number creating several different products with their own SKU counts in inventory. Metadata 304 associated with SKU 303 may include variable data such as identification of a product host or handler that presents the product in the media. SKU 303 is associated directly with Inventory count 305, which is the number of units that are currently in stock.

Video 301 may contain from one to many cue points 306.
A cue point is an identified or marked point in time in the video for offering some form of interaction. Cue point 306 may coincide with from one to many product types 302 assigned an SKU number. That is to say that the product SKU data may be associated with a cue point by time stamp or by interactive component. One Video 301 may contain from one to many time ranges 307. A time range is a span of time marked or identified within a video for offering an interaction. Time range 307 coincides with from one to many product types 302 identified by SKUs 303.

Cue point 306 includes from one to many interaction starts. An interaction start is a beginning point for initiating an interaction sequence. An interactive component such as a buy button may represent the beginning of an interaction sequence. It is also noted herein that an interaction start may or may not be product specific. Time range 307 includes from one to many interaction starts. For example, a time range characterized by an active visual display of an interactive component may coincide with a visual demonstration of one or more products in the video. The interactive component can be activated anytime during its display to initiate an interactive sequence leading to purchase of the product or products that are actively demonstrated within that identified time range in the video. In one embodiment, there may be additional interactive components available to the potential consumer linked to or otherwise available through the video such as one that may offer an interactive menu as an interaction start that contains more than one interactive option, such as to buy now, see more similar products, publish comments, resume video play, and so on. It is noted herein that video 301 may contain one or more cue points without containing a time range and vice versa.

An interaction start 308 may result in zero to many transactions 309. Transaction 309 is defined as a confirmed purchase of one or more products. Typically, activating an interaction start leads to the opportunity to engage in a transaction relative to the products demonstrated in the video and associated with the interaction start. However, as a transaction sequence ensues, opportunity may be presented to potential consumers for purchasing additional products that are displayed or demonstrated within the current video. Moreover, a potential consumer may initiate a transaction sequence only to abandon it before purchase confirmation. A purchase confirmation may be knowledge of the order items and amounts and a successful payment submission.

A single transaction causes an update to one or many product inventory counts 305. A transaction will include data specifying the SKUs ordered and the amounts of each SKU ordered. The purchasing activity dictates the updating process of inventory product counts. Purchase confirmation must be obtained before product counts are updated. Inventory count 305 may be reflected in a product repository that contains the product types and counts of all available products. Inventory count 305 may also be reflected within the product video data along with SKU metadata. SKU metadata may also, but not necessarily, list the seller, brand, video host, videos that demonstrate the product, and the time frames in the videos where the product is demonstrated and or mentioned.

A mapping table that associates media presentations with product sellers and product hosts may look like the table below.

| Video ID | Host ID | Cue Point/Time | Seller ID | Cue Point/Time |
|---|---|---|---|---|
| ABC123 | ZYXWV | 0:15 | 98765 | 0:19 |
| ABC124 | ZYXWU | 0:16 | 98772 | 0:20 |

The unique media presentation identifier is listed in the first column. The unique identifier of one or more product hosts is listed in the second column. The identification of the product host may be associated with a point in time such as a cue point represented in the third column. Information including the identification (name) of a product host that is shown in the media presentation may be triggered to appear by the associated cue point. The information may display for a specified or pre-programmed period of time after the cue point. The same is true regarding the seller. Any person shown in the video or that might be associated with products depicted in the video may be uniquely identified and may have metadata including name, affiliations, and other pertinent data that a potential consumer might want to see appear to the potential consumer in an informational or educational manner.

A potential consumer may also publish comments and recommendations by interacting with an interaction component provided within the video and displayed within a specified time range or at a specific cue point within the video. Interactive components may include text boxes, video overlays, action bars, radio buttons, or invisible interactive regions timed to display over the products being demonstrated. A mapping table for associating comments to media presentations may look like the table below.

| Video ID | User ID | TIP/Text | Cue Point/Time Stamp |
|---|---|---|---|
| ABC123 | 456778 | Love this dress | 0:57 |
| ABC123 | 567942 | Does this fit a petite? | 1:48 |
| ABC125 | 995672 | I love Gina - I always trust her feedback | NA - Relevant to the video |

The media presentations, in this case, videos are uniquely identified in the first column. The potential consumer (user) identifier is listed in the second column. The comment/tip text is included in the third column. The cue points in the video that correspond to inserted text are listed in the fourth column. It is noted herein that a single video may include many comments and tips that have been added over the life of that video. Moreover, there may be constraints placed on the number of tips or comments that can be associated to a media presentation such as an interactive shopping video. It is noted herein that many interactive shopping videos may be temporarily published such as might be the case of promotional videos that tout a time-sensitive sale such as a discount available only at a specified date and time. In such cases, tips and comments might be archived with the product information (SKU metadata) after the video is purged or the video may also be archived for any reason.

Figure 4:
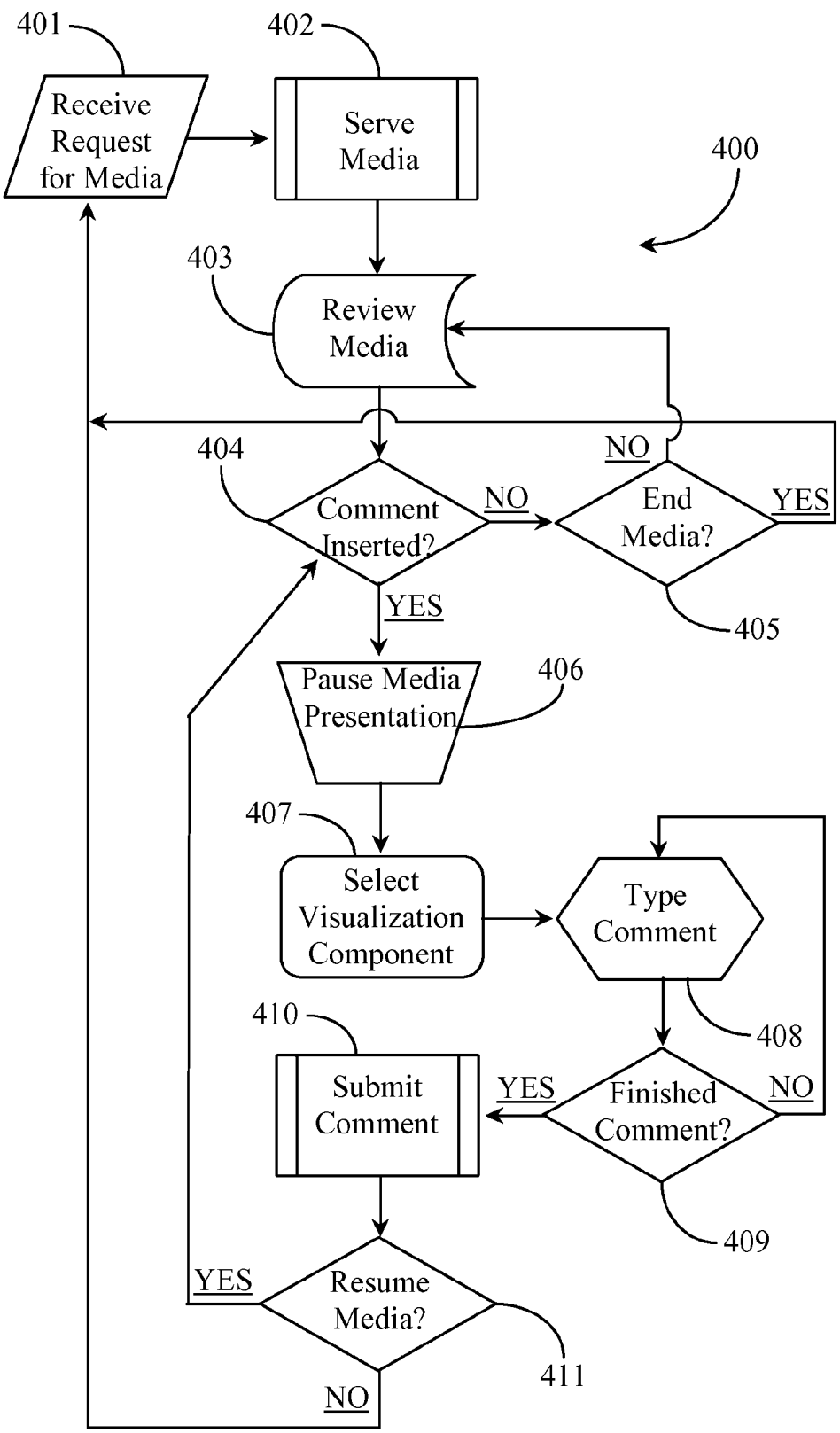
FIG. 4 is a process flow chart depicting steps for initiating associating comments with cue points or time ranges within an interactive media presentation according to an embodiment of the present invention.

FIG. 4 is a process flow chart 400 depicting steps for initiating and associating comments with cue points or time ranges within an interactive media presentation according to an embodiment of the present invention. At step 401, the media server receives a request for media from a user connected to the web site. The media is an interactive shopping video in a preferred embodiment. However, in one aspect the media may be a power point presentation, a graphics slide show, or some other digital presentation rendered as an animated and interactive presentation.

The media request may be initiated by a potential consumer, by a video host, by an agent representing a merchant or retailer, or by a knowledge worker operating in the name of the service provider. At step 402, the media server serves the media. In a preferred embodiment, the media is an interactive video file. In one embodiment, the media is served to the website that the user is connected to, the media consumed while the user remains connected to the site. In another embodiment, the user is redirected to a media site and the media executes from the media site, the user connected to the media site while consuming the media. In still another embodiment, the user has connection to both channels (website, media page) while the media is consumed.

The user reviews the media at step 403. The media may be paused, played, rewound, skipped through, or fast-forwarded during media review. In the case of a knowledge worker, or other authorized user, access to media may be available through database acquisition from a connected network such as LAN 105 of FIG. 1. However, this process focuses on users that access the media with the intent of leaving a comment. At step 404, the user may make a decision whether or not to or otherwise tag a comment to the media file.

At step 404, if the user decided not to insert a comment, the user may determine whether to end the media presentation at step 405. If the user has determined not to end the media at step 405, the process may resolve back to step 403 where media review may continue. If the user determines to end the media presentation without posting a comment, the process ends for that user and the process may loop back to step 401 and 402 wherein the media server processes requests for media in a continuous fashion.

A media presentation such as a video may be a very short (1:00 minute or less) or much longer (5:00 minutes or greater). A user may insert one to many comments into different points within the media timeline or storyboard. If the user decides to post or insert a comment into the media file at step 404, then the process moves to step 406 where the user may pause the media presentation at the point the comment will be tagged or associated to. The comment may be later displayed wherein such display may be triggered by the cue point passing the next time the media presentation is played. The duration of the display of the comment may vary and may be ordered by the user within limits as part of the interactive options provided by the service.

In this case, the user is prompted to select a visualization component at step 407. The act of pausing the media presentation at step 406 launches the interactive component. The visualization component may be a visual overlay, a text balloon or box, a sidebar, a floating comment, or a comment that appears in some notification window associated proximal to the media player window or frame, or digital space surrounding the media player window. The system may provide a second interactive component in the form of a text input box or field at step 408 for the user to utilize to input the comment. The type of comment may vary according to user type and intent. For example, a consumer may type a recommendation to purchase a particular product reviewed or previously purchased and evaluated by that consumer. A video host or retail agent may type a useful tip related to a demonstrated product such as an accessory tip, an up sell recommendation, or some other useful information.

At step 409, the user decides if he or she is finished typing the comment. This step may include reviewing and correcting a proposed comment before tagging or inserting the comment. The user is not finished with the comment at step 409, the process resolves back to step 408 for correction and review. If the user is finished with the comment at step 409, the user may submit the comment at step 410. Upon comment submission, the comment is automatically associated (tagged) to the point in time (cue point) defined by pausing the video. The user may specify the display period for the comment within certain constraints that may be set up by the service. For example, a maximum display time might be a few seconds or just enough time for the comment to be read. In one aspect, the user may specify a time range by skipping forward from a paused point in time. In another aspect the user may determine a time range by pausing, then fast forwarding, and then pausing again to associate a comment to the entire range meaning that it may appear at any time within a specified portion of a video, for example.

A mapping table for mapping tips or recommendations inserted into a media presentation by video hosts or sellers may look like the table below.

| Video ID | TIP/Text | Cue Point/Time Stamp |
|---|---|---|
| ABC123 | Fits true to size | 0:33 |
| ABC124 | Users give this 4 out of 5 stars | 1:29 |
| ABC125 | Hang this on a colored wall to accent the art even more | 2:45 |

The first column lists the media presentation by unique identifier. The second column lists tip text representing the tips typed into a text interface provided for the purpose. The third column lists the cue point or time stamp in the media presentation where the tip or recommendation is anchored. The cue point or time stamp associated to it triggers a tip or recommendation. The tip may appear to the potential consumer in a text box, pop-up balloon, in a text overlay, or through some other visual component provided for the purpose. A tip may be programmed to appear for certain duration such as a few seconds after the cue point triggers the text to appear.

Referring back to FIG. 4, after content submission at step 410, the user may make a decision whether to resume media review at step 411. If the user decides not to resume the media presentation, the process may end for that user and the process may resolve back to step 401 and 402 for continued processing of media requests by users. If the user resumes the media presentation (continues playing the media) at step 411, the process may resolve back to step 404 and the user may determine whether or not to insert another comment. It is noted herein that the user may, in some aspects, be allowed or authorized to rewind, pause, skip, loop, or replay media presentations to navigate to an appropriate point in time for inserting a comment. Such a point in time may coincide with the visual product display and demonstration in the media. For example, a comment about a purse may pop up in the next session of media presentation at or during the time that the purse is visible in the media. In one aspect there may be a constraint that limits the number of comments that may be inserted into a media presentation such as an interactive shopping video. In one aspect, comments are not visible to a next potential consumer unless the system detects an interaction such as the user clicking on a product or pausing the presentation at a point where the product is visible. In this way a user may manually look for comments. In another aspect comments automatically display for some programmed period of time from a cue point identified in the presentation by pausing the presentation to type the comment.

It will be apparent to one with skill in the art that the inventory control system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for managing product inventory comprising: an Internet-connected server; a media repository containing videos; and software executing on the server from a non-transitory physical medium, the software providing:
 establishment using the server of a first association in memory of the server of at least one stock keeping unit (SKU) of a product and associated metadata including product availability counts to a video identifier and at least one point in time within an interactive shopping video presentation of one of the videos from the media repository;
 establishment using the server of a second association of at least one potential consumer to the interactive shopping video presentation;
 using the server, causing displaying within a single interactive shopping interface, in communication with any of a laptop, smart phone or desktop computer of the potential consumer, the interactive shopping video presentation and two or more interactive components embedded in one of the videos of the interactive shopping video presentation, the interactive components comprising two or more of: video overlays, interactive pop-up screens, interactive purchase icons, or buttons; and wherein one of the interactive components is configured to be manipulated to initiate an interaction sequence resulting in a purchase;
 using the server, monitoring for and tracking of interaction sequences initiated by the at least one potential consumer, using any of the laptop, smart phone or desktop computer, the interaction sequences enabled from within the interactive shopping video presentation using an interactive component, the monitoring including detecting selection of a particular button;
 automatic adjustment, in real-time, using the server of the product availability counts associated with the interactive shopping video presentation based upon the interaction sequences that have been monitored for and tracked;
 at the at least one point in time or later during playing the interactive shopping video presentation, and coinciding with a displayed representation of a particular product, determining using the server based upon the current product availability counts that a particular product is not available for purchase, and in response, automatically using the server, causing disabling the displaying on any of the laptop, smart phone or desktop computer a particular interactive component that would initiate a transaction to purchase the particular product.

2. The system of claim 1, wherein the associated metadata includes one or a combination of color, size, quantity, price, and credits available, if any, along with the current product inventory count.

3. The system of claim 1, wherein the point in time coincides with a graphic or audio representation of the particular product.

4. The system of claim 1, wherein a second one of the interactive components is visible at the at least one point in time.

5. The system of claim 1, wherein the establishment of the second association is dynamic and automatic.

6. The system of claim 4, wherein the second one of the interactive components is one of a visual overlay, a text box, a link to an order form, or a purchasing icon.

7. The system of claim 1, wherein the software further provides a posting interface, the posting interface adapted to enable posting of comments and recommendations by potential consumers associated with the interactive shopping video presentation.

8. The system of claim 7, wherein the posting interface creates a third dynamic association of at least one tip, recommendation, or comment to at least one point in time and or at least one time range within the interactive shopping video presentation.

9. The system of claim 1, wherein the interaction sequences initiated within the interactive shopping video presentation by the at least one potential consumer continue on a transaction server.

10. The system of claim 1, wherein the product availability counts are adjusted dynamically during accounting based on number of confirmed purchases.

11. The system of claim 1, wherein product inventory is dynamically reordered or replenished to updated counts based on count thresholds triggered through count adjustments relative to consumer interaction results.

12. A method for managing product inventory comprising:
 (a) using an Internet-connected server, creating and storing a mapping in memory of the server that associates product stock keeping units (SKUs) of products, associated metadata, and current product availability counts to a video identifier and at least one point in time an interactive shopping video presentation of one of videos stored in a media repository containing videos;
 (b) using the server, mapping at least one potential consumer to the interactive shopping video presentation;
 (c) using the server, causing displaying within a single interactive shopping interface, in communication with any of a laptop, smart phone or desktop computer of the potential consumer, the interactive shopping video presentation and two or more interactive components embedded in one of the videos of the interactive shopping video presentation, the interactive components comprising two or more of: video overlays, interactive pop-up screens, interactive purchase icons, or buttons; and wherein one of the interactive components is configured to be manipulated to initiate an interaction sequence resulting in a purchase;
 (d) using the server, monitoring and tracking interaction sequences initiated by the at least one potential consumer, using any of the laptop, smart phone or desktop computer, the interaction sequences enabled from within the interactive shopping video presentation using an interactive component, the monitoring including detecting selection of a particular button;
 (e) in real-time, using the server, automatically adjusting the current product availability counts associated with the interactive shopping video presentation based upon the interaction sequences that are monitored and tracked in step (d);
 using the server, at the at least one point in time or later during playing the interactive shopping video presentation and coinciding with a displayed representation of a particular product, determining based upon the current product availability counts that a particular product is not available for purchase, and in response, automatically using the server, causing disabling the displaying on any of the laptop, smart phone or desktop computer, an interactive component that would initiate a transaction to purchase the particular product.

13. The method of claim 12, wherein the associated metadata includes one or a combination of color, size, quantity, price, and credits available, if any, along with the current product inventory counts.

14. The method of claim 12, wherein in step (a), the point in time coincides with a graphic or audio representation of the particular product.

15. The method of claim 12, wherein a second one of the interactive components is visible at the at least one point in time.

16. The method of claim 15, wherein the second one of the interactive components is one of a visual overlay, a text box, a link to an order form, or a purchasing icon.

17. The method of claim 12 comprising updating an inventory count of a product repository that is associated with the metadata based upon the interaction sequences that are monitored and tracked.

18. The method of claim 12 wherein the interactive component comprises an interactive order form.

19. The method of claim 12 further comprising, as new product is stocked, updating the product availability counts of the metadata associated with a plurality of video presentations.

20. The method of claim 12 further comprising:
at the at least one point in time or later during playing the interactive shopping video presentation, determining that a particular current product availability count for a particular product is negative;
in response, enabling the interactive component that would initiate a transaction to purchase the particular product.

21. The method of claim 12 further comprising:
facilitating a single transaction comprising a confirmed purchase of one or more products;
in response to the single transaction, causing an update to a plurality of the current product availability counts for a plurality of video presentations all of which include the one or more products.

22. A data processing method comprising:
using an Internet-connected server, creating and storing a mapping in memory of the server that associates video identifiers of interactive shopping video presentations, any of cue points, time stamps, time windows or time ranges within the video presentations, and product stock keeping units (SKUs) of products that are displayed within the video presentations of one of videos stored in a media repository containing videos;
using the server, causing displaying within a single interactive shopping interface, in communication with any of a laptop, smart phone or desktop computer of the potential consumer, the interactive shopping video presentation and two or more interactive components embedded in one of the videos of the interactive shopping video presentation, the interactive components comprising two or more of: video overlays, interactive pop-up screens, interactive purchase icons, or buttons; and wherein one of the interactive components is configured to be manipulated to initiate an interaction sequence resulting in a purchase;
using the server, providing, within each of the video presentations, associated metadata that is associated with each of the product SKUs, wherein the metadata includes current product availability counts for the products represented by the product SKUs;
using the server, monitoring interaction sequences of at least one potential consumer using any of the laptop, smart phone or desktop computer, the interaction sequences enabled from within the interactive shopping video presentation using an interactive component, the monitoring including detecting selection of a particular button;
in real-time, using the server, as the interaction sequences occur in the interactive shopping video presentation, automatically updating the current product availability counts associated with the particular interactive shopping video presentation based upon the interaction sequences;
using the server, at a particular time point during the playing and coinciding with a displayed representation of a particular product, determining based upon the mapping and the current product availability counts that a particular product is not available for purchase, and in response, automatically using the server, causing disabling the displaying on any of the laptop, smart phone or desktop computer, an interactive component that would initiate a transaction to purchase the particular product.

* * * * *